US009288733B2

(12) United States Patent
Dimou et al.

(10) Patent No.: US 9,288,733 B2
(45) Date of Patent: Mar. 15, 2016

(54) SYSTEMS AND METHODS FOR CONTROLLING CELL SELECTION IN A HETEROGENEOUS CELLULAR NETWORK BASED ON PRIMARY DIRECTION OF TRAFFIC FLOW

(75) Inventors: Konstantinos Dimou, Stockholm (SE); Gary David Boudreau, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 646 days.

(21) Appl. No.: 13/242,852

(22) Filed: Sep. 23, 2011

(65) Prior Publication Data

US 2013/0077599 A1    Mar. 28, 2013

(51) Int. Cl.
H04W 4/00    (2009.01)
H04W 36/22   (2009.01)
H04W 36/04   (2009.01)

(52) U.S. Cl.
CPC .............. *H04W 36/22* (2013.01); *H04W 36/04* (2013.01)

(58) Field of Classification Search
CPC . H04W 36/22; H04W 36/24; H04W 36/0061; H04W 36/14; H04W 36/28; H04W 36/34; H04W 36/36; H04W 36/00; H04W 36/16
See application file for complete search history.

(56) References Cited

U.S. PATENT DOCUMENTS

| 8,599,782 | B2 | 12/2013 | Chung et al. |
| 8,644,209 | B2 | 2/2014 | Seo et al. |
| 2005/0130662 | A1 | 6/2005 | Murai |
| 2006/0007936 | A1 | 1/2006 | Shrum, Jr. et al. |
| 2006/0142021 | A1 | 6/2006 | Mueckenheim et al. |
| 2007/0217357 | A1* | 9/2007 | Kitakado ....................... 370/329 |
| 2008/0025214 | A1 | 1/2008 | Bettink et al. |
| 2008/0232326 | A1 | 9/2008 | Lindoff et al. |
| 2009/0147742 | A1 | 6/2009 | Tsai et al. |
| 2009/0286563 | A1* | 11/2009 | Ji et al. ........................... 455/501 |

(Continued)

FOREIGN PATENT DOCUMENTS

| JP | 2000269881 | * | 9/2000 | ............... H04B 7/26 |
| WO | WO9913670 A1 | | 3/1999 | |

(Continued)

OTHER PUBLICATIONS

International Search Report for International Patent Application PCT/IB2012/054975 mailed Jan. 30, 2013, 13 pages.

(Continued)

*Primary Examiner* — Chi H Pham
*Assistant Examiner* — Raul Rivas
(74) *Attorney, Agent, or Firm* — Withrow & Terranova, PLLC

(57) ABSTRACT

Systems and methods are disclosed for controlling cell selection between a high power base station and a neighboring low power base station in a cellular network. In one embodiment, a primary direction of traffic flow for a user equipment located within a transition zone between a high power base station cell of the high power base station and a low power base station cell of the low power base station is determined to be either an uplink direction or a downlink direction. Cell selection for the user equipment is then controlled based on the primary direction of traffic flow for the user equipment such that selection of the high power base station cell is favored if the primary direction of traffic flow is the downlink direction and selection of the low power base station cell is favored if the primary direction of traffic flow is the uplink direction.

42 Claims, 7 Drawing Sheets

(56) References Cited

U.S. PATENT DOCUMENTS

| | | | |
|---|---|---|---|
| 2010/0120446 A1 | 5/2010 | Gaal | |
| 2010/0135166 A1* | 6/2010 | Ahluwalia | 370/252 |
| 2010/0172329 A1* | 7/2010 | Yokoyama et al. | 370/332 |
| 2010/0232285 A1 | 9/2010 | Lee et al. | |
| 2011/0261747 A1* | 10/2011 | Wang et al. | 370/315 |
| 2011/0263260 A1* | 10/2011 | Yavuz et al. | 455/437 |
| 2012/0151041 A1* | 6/2012 | Gerber et al. | 709/224 |
| 2014/0133365 A1 | 5/2014 | Peng et al. | |
| 2014/0153535 A1 | 6/2014 | Lei et al. | |

FOREIGN PATENT DOCUMENTS

| | | |
|---|---|---|
| WO | WO0018164 A1 | 3/2000 |
| WO | WO2011031194 A1 | 3/2011 |

OTHER PUBLICATIONS

Alcatel-Lucent, "Blank Subframes for LTE", 3rd Generation Partnership Project (3GPP), Aug. 24-28, 2009, vol. RAN WG1_58, No. R1-093340, 2 pages, Shenzhen, China.

Author Unknown, "3rd Generation Partnership Project: Overall Description Stage 2 (Release 10)", 3rd Generation Partnership Project (3GPP TS 36.300), Sep. 2011, V10.5.0, 194 pages, Valbonne, France.

Author Unknown, "3rd Generation Partnership Project: Protocol Specification (Release 10)", 3rd Generation Partnership Project (3GPP TS 36.331), Sep. 2011, V10.3.0, 296 pages, Valbonne, France.

Author Unknown, "3rd Generation Partnership Project: X2 Application Protocol (X2AP) (Release 10)", 3rd Generation Partnership Project (3GPP TS 36.423), Sep. 2011, V10.3.0, 132 pages, Valbonne, France.

LG Electronics, "Considerations on Coexistence of Frequency and Time Domain ICIC", 3rd Generation Partnership Project (3GPP), Feb. 21-25, 2011, vol. RAN WG1_64, No. R1-110889, 4 pages, Taipei, Taiwan.

New Postcom, "Considerations for Interactions Between FD and TD ICIC", 3rd Generation Partnership Project (3GPP), Jan. 17-21, 2011, vol. RAN WG3_70BIS, No. R3-110043, 3 pages, Dublin, Ireland.

New Postcom, "Downlink Control Signaling Enhancements", 3rd Generation Partnership Project (3GPP), Oct. 10-14, 2011, vol. RAN WG1_66bis, No. R1-112986, 3 pages, Zhuhai, China.

Samsung, "Further Consideration on eICIC ABS Pattern", 3rd Generation Partnership Project (3GPP), Jan. 17-21, 2011, vol. RAN WG4_57AH, No. R4-110260, 3 pages, Austin, Texas.

ZTE, "Remaining Issues on CSI-RS", 3rd Generation Partnership Project (3GPP), Nov. 15-19, 2010, vol. RAN WG1_63, No. R1-105957, 5 pages, Jacksonville, Florida.

International Search Report for PCT/IB2012/056836, mailed Apr. 8, 2013, 18 pages.

Non-final Office Action for U.S. Appl. No. 13/310,177 mailed Feb. 21, 2014, 22 pages.

International Preliminary Report on Patentability for PCT/IB2012/054975 mailed Dec. 18, 2013, 9 pages.

Written Opinion for PCT/IB2012/054975, mailed Sep. 19, 2013, 9 pages.

Shrivastava, Shweta et al., "Performance Analysis of Persistent Scheduling for VoIP in WiMAX Networks," IEEE 10th Annual Wireless and Microwave Technology Conference (WAMICON '09), Apr. 21, 2009, 5 pages.

Susitaival, Riikka et al., "LTE Coverage Improvement by TTI Bundling," IEEE 69th Vehicular Technology Conference (VTC '09), Apr. 26, 2009, 5 pages.

Non-Final Office Action for U.S. Appl. No. 13/310,177, mailed Sep. 12, 2013, 23 pages.

International Preliminary Report on Patentability for PCT/IB2012/056836 mailed Jun. 12, 2014, 12 pages.

Final Office Action for U.S. Appl. No. 13/310,177, mailed Sep. 18, 2014, 18 pages.

Author Unknown, "Technical Specification Group Radio Access Network; Evolved Universal Terrestrial Radio Access (E-UTRA); Physical Channels and Modulation (Release 8)," Technical Specification 36.211, Version 8.6.0, 3GPP Organizational Partners, Mar. 2009, 83 pages.

Ericsson, "Tdoc R2-072630: HARQ operation in case of UL Power Limitation," 3rd Generation Partnership Project (3GPP) TSG-RAN WG2 #58bis, Jun. 25-29, 2007, 4 pages, Orlando, USA.

Non-Final Office Action and Applicant Initiated Interview Summary for U.S. Appl. No. 13/310,177, mailed Dec. 19, 2014, 21 pages.

Author Unknown, "Technical Specification Group Radio Access Network; Evolved Universal Terrestrial Radio Access (E-UTRA); Medium Access Control (MAC) protocol specification (Release 9)," Technical Specification 36.321, Version 9.0.0, 3GPP Organizational Partners, Sep. 2009, 47 pages.

Examiner-Initiated Interview Summary for U.S. Appl. No. 13/310,177, mailed Feb. 20, 2015, 3 pages.

Notice of Allowance for U.S. Appl. No. 13/310,177, mailed Sep. 21, 2015, 8 pages.

\* cited by examiner

SYSTEMS AND METHODS FOR CONTROLLING CELL SELECTION IN A HETEROGENEOUS CELLULAR NETWORK BASED ON PRIMARY DIRECTION OF TRAFFIC FLOW

FIELD OF THE DISCLOSURE

The present disclosure relates to cell selection in a heterogeneous cellular network.

BACKGROUND

Due to constantly increasing demand for high data rates, cellular networks that can meet this demand are required. One major issue for cellular network operators is finding ways to evolve their existing cellular networks to provide higher data rates. In this respect, the following approaches have been proposed to provide higher data rates in existing cellular networks: (i) increasing the density of existing macro base stations, (ii) increasing cooperation of existing macro base stations, or (iii) deploying pico base stations in areas where high data rates are needed within a macro base station grid. Approaches (i) and (ii) are problematic in that it is often difficult to find new locations for macro base stations especially in urban environments and both result in significant costs and delays. In addition, increasing the density of macro base stations would lead to a significant increase in signaling due to frequent handovers for users moving at high speeds.

A cellular network including the pico base stations in approach (iii) is referred to herein as a "heterogeneous cellular network" or a "heterogeneous deployment." The pico base stations may also be referred to as micro base stations or low power nodes (LPNs). Pico base stations are advantageous because it is easier and more cost efficient to find sites for pico base stations. In addition, pico base stations are expected to be more cost-efficient than macro base stations and their deployment time is expected to be shorter. With heterogeneous cellular networks, the macro base stations (i.e., the macro layer grid) can serve mainly users moving at high speeds or wider areas where demand for high data rates is relatively low. The pico base stations (i.e., the pico layer grid) can then cater to areas with many users desiring high data rates but having lower mobility (i.e., "hotspots").

FIG. 1 illustrates a conventional heterogeneous cellular network 10. As illustrated, the heterogeneous cellular network 10 includes macro base stations 12-1 through 12-4 (generally referred to herein collectively as macro base stations 12 and individually as macro base station 12) having corresponding coverage areas, which are referred to herein as macro base station cells 14-1 through 14-4 (generally referred to herein collectively as macro base station cells 14 and individually as macro base station cell 14). The heterogeneous cellular network 10 also includes pico base stations 16-1 through 16-4 (generally referred to herein collectively as pico base stations 16 and individually as pico base station 16) having corresponding coverage areas, which are referred to herein as pico base station cells 18-1 through 18-4 (generally referred to herein collectively as pico base station cells 18 and individually as pico base station cell 18). The transmission power of the pico base stations 16 is much smaller than the transmission power of the macro base stations 12, which results in the pico base station cells 18 being much smaller than the macro base station cells 14.

In this example, each of the pico base station cells 18 is within a corresponding one of the macro base station cells 14. However, the heterogeneous cellular network 10 is not limited thereto. Some of the macro base station cells 14 may include no pico base station cells 18 while other macro base station cells 14 may include one or more pico base station cells 18. Further, it should be noted that the pico base station 16-1 is referred to herein as "neighboring" the macro base station 12-1. Likewise, the pico base stations 16-2, 16-3, and 16-4 are neighboring pico base stations for the macro base stations 12-2, 12-3, and 12-4, respectively. Thus, a pico base station (e.g., one of the pico base stations 16) whose pico base station cell borders the macro base station cell of a macro base station (e.g., one of the macro base stations 12) is referred to herein as a neighboring pico base station of the macro base station.

In the conventional heterogeneous cellular network 10, cell selection is performed such that user equipments (UEs) (e.g., mobile devices) are connected to the macro base station 12 or pico base station 16 providing the best downlinks for those UEs. In other words, a UE measures a received signal strength for a downlink from the nearest macro base station 12 and a received signal strength for a downlink from the nearest pico base station 16. If the macro base station 12 provides the best downlink (i.e., has the highest received signal strength at the UE) for the UE, then the macro base station cell 14 is selected as the serving cell for the UE. Otherwise, if the pico base station 16 provides the best downlink for the UE, then the pico base station cell 18 is selected as the serving cell for the UE. For Long Term Evolution (LTE) networks, the received signal strength is typically measured by Reference Signal Received Power (RSRP) measurements.

One issue that arises when using the conventional cell selection scheme is that the UEs are connected to the macro or pico base stations 12 or 16 that provide the best downlink for the UEs but not necessarily the best uplink for the UEs. This issue is illustrated in FIG. 2. More specifically, FIG. 2 illustrates a first cell edge, or border, 20 between the macro base station cell 14 and the pico base station cell 18 determined based on downlink received signal strength according to the conventional cell selection scheme. FIG. 2 also illustrates a second cell edge, or border, 22 between the macro base station cell 14 and the pico base station cell 18 determined based on uplink path loss. Thus, as shown in FIG. 2, the conventional cell selection scheme that performs cell selection to provide the best downlink does not necessarily provide the best uplink. Specifically, using the conventional cell selection scheme that provides the best downlink, a UE 24 would be connected to the macro base station 12. As a result, the UE 24 is provided with the best downlink, but does not have the best uplink. As a result, using the conventional cell selection scheme, data rates, particularly in the uplink direction, are not optimal. Specifically, the UE 24 is not connected to the pico base station 16 providing the best uplink for the UE 24. Also, the links for other UEs connected to the pico base station 16 are negatively affected by higher uplink interference generated by the UE 24.

As such, there is a need for systems and methods for controlling cell selection in a heterogeneous cellular network to provide increased data rates.

SUMMARY

Systems and methods are disclosed for controlling cell selection between a high power base station and a neighboring low power base station in a cellular network. The high power base station provides service for a corresponding high power base station cell, and the low power base station provides service for a corresponding low power base station cell. In one embodiment, a primary direction of traffic flow for a user equipment located within a transition zone between the high power base station cell and the low power base station cell is determined to be either an uplink direction or a downlink direction. Cell selection for the user equipment is then controlled based on the primary direction of traffic flow for the user equipment such that selection of the high power base station cell is favored if the primary direction of traffic flow for the user equipment is the downlink direction and selection of the low power base station cell is favored if the primary direction of traffic flow for the user equipment is the uplink direction. In one embodiment, the high power or low power base station cell is favored by adjusting a border of the low power base station cell (i.e., either extending or contracting the border of the low power base station cell). In one preferred embodiment, the border of the low power base station cell is adjusted via a user equipment cell selection offset value for the user equipment.

In one embodiment, the cellular network is a heterogeneous cellular network, where the high power base station is a macro base station and the neighboring low power base station is a pico base station. The macro base station provides service for a corresponding macro base station cell, and the pico base station provides service for a corresponding pico base station cell. In one embodiment, a primary direction of traffic flow for a user equipment located within a transition zone between the macro base station cell and the pico base station cell is determined to be either an uplink direction or a downlink direction. Cell selection for the user equipment is then controlled based on the primary direction of traffic flow for the user equipment such that selection of the macro base station cell is favored if the primary direction of traffic flow for the user equipment is the downlink direction and selection of the pico base station cell is favored if the primary direction of traffic flow for the user equipment is the uplink direction. In one embodiment, the macro or pico base station cell is favored by adjusting a border of the pico base station cell. In one preferred embodiment, the border of the pico base station cell is adjusted via a user equipment cell selection offset value for the user equipment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a conventional heterogeneous cellular network including macro base stations and pico base stations;

FIG. 2 graphically illustrates that the conventional cell selection scheme for the heterogeneous cellular network of FIG. 1 provides the best downlink but does not always provide the best uplink;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for controlling cell selection between a high power base station and a neighboring low power base station in a cellular network based on primary direction of traffic flow. The embodiments described herein focus on a heterogeneous cellular network, where the high power base station is specifically a macro base station and the low power base station is a pico base station. However, the present disclosure is not limited thereto. The high power base station and the low power base station may be any two base stations in a cellular network having a considerable difference in transmission power. For instance, the present disclosure is also applicable to embodiments where the high power base station is a typical base station and the low power base station is a relay.

Figure 1:
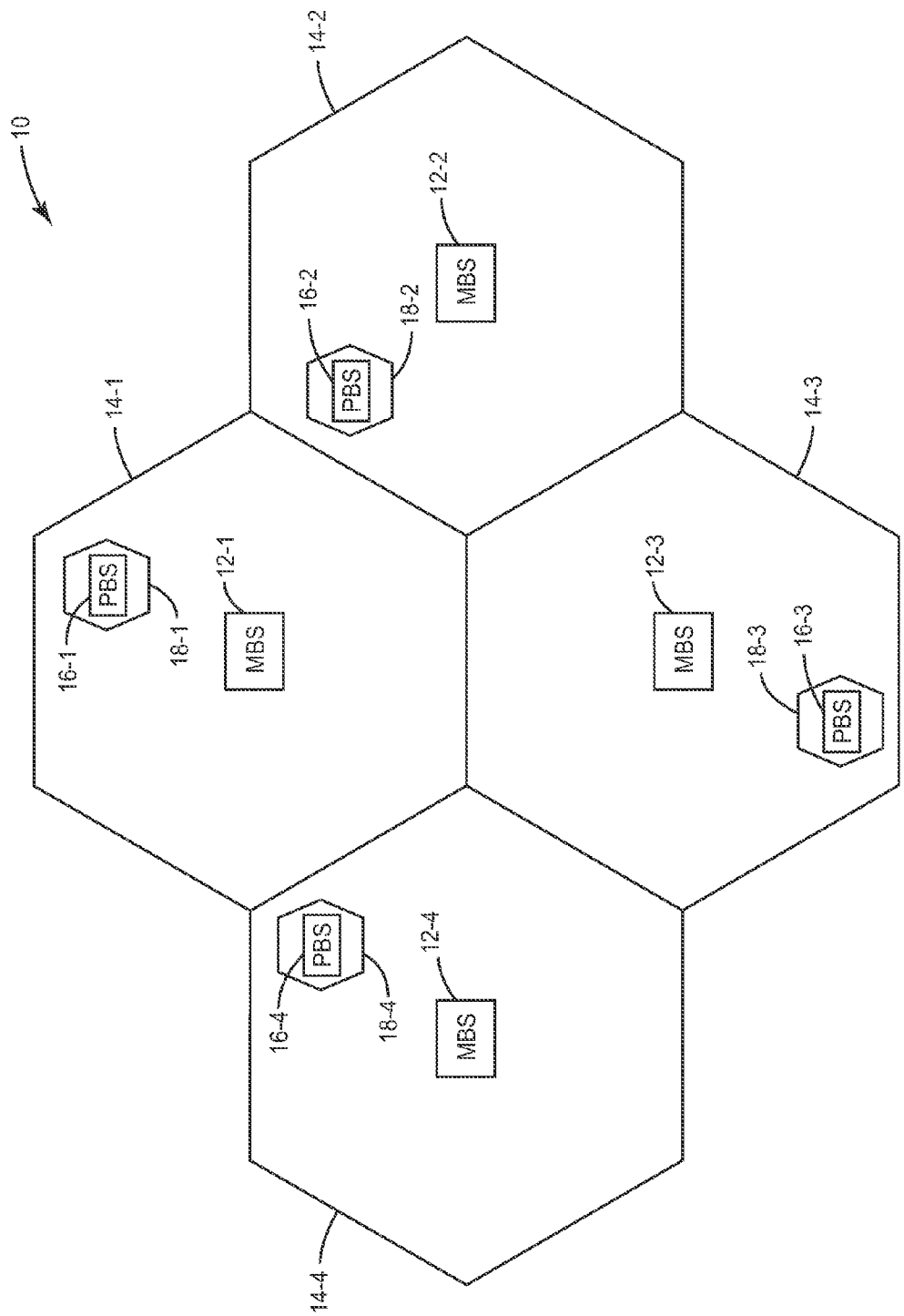
Figure 2:
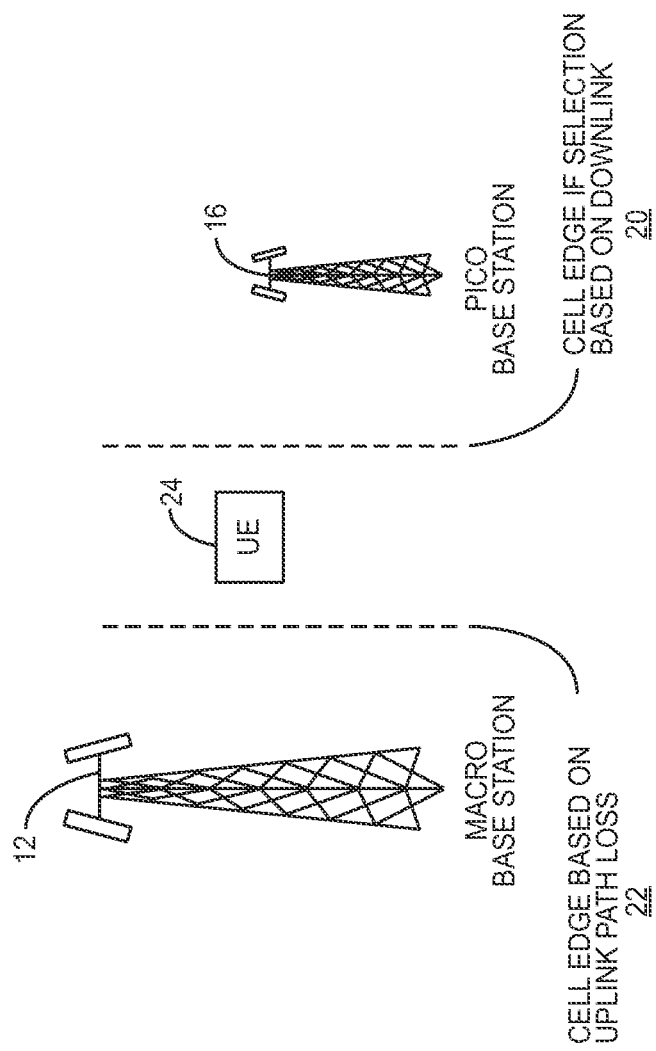
Figure 3:
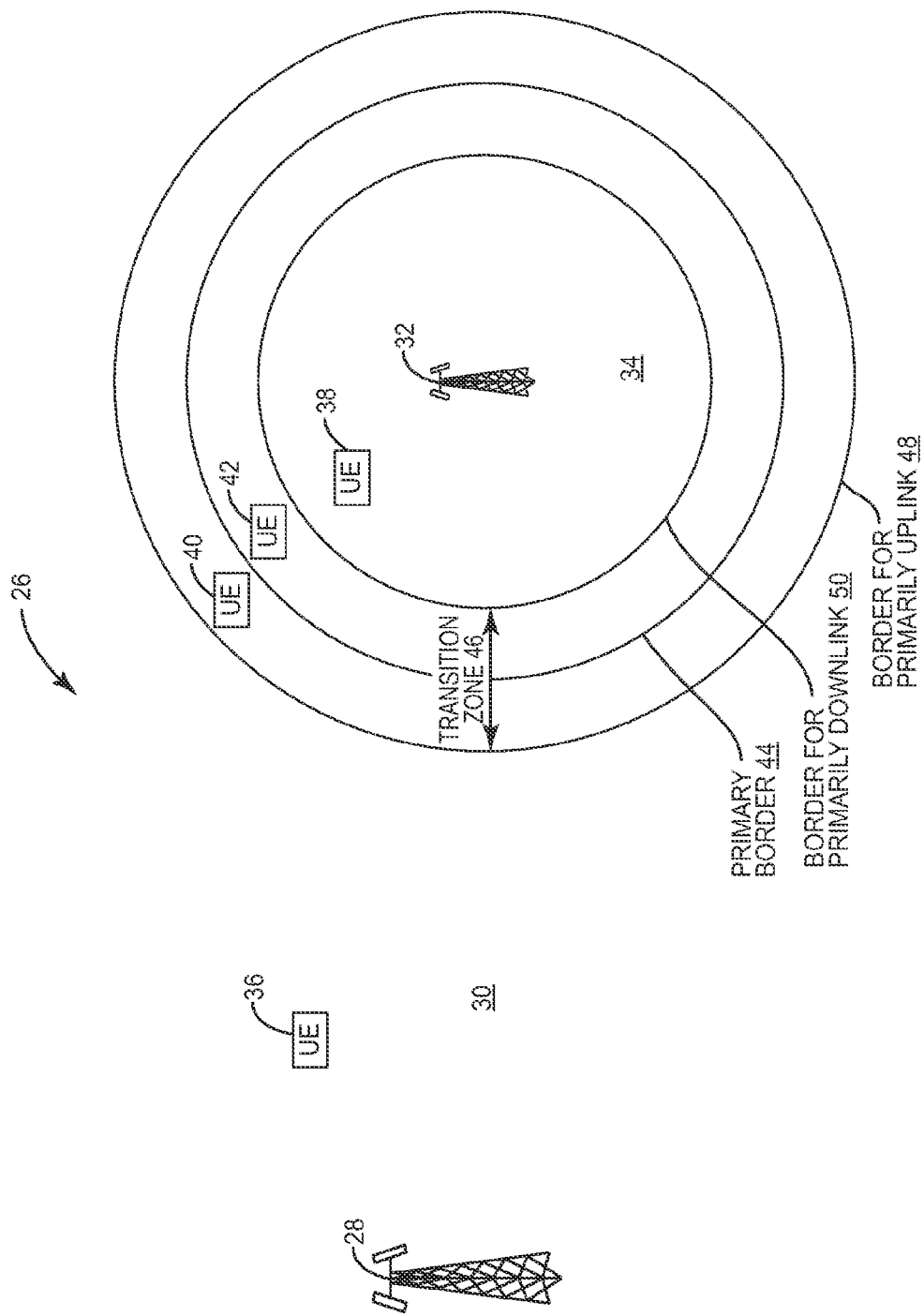
FIG. 3 illustrates a macro base station and a pico base station in a heterogeneous cellular network where cell selection is controlled on a per user equipment basis based on primary direction of traffic flow according to one embodiment of the present disclosure.

FIG. 3 illustrates one exemplary embodiment of a heterogeneous cellular network 26 in which cell selection is controlled based on primary direction of traffic flow. As illustrated, the heterogeneous cellular network 26 includes a macro base station 28 having a corresponding macro base station cell 30 and a pico base station 32 having a corresponding pico base station cell 34. The pico base station 32 is referred to herein as a neighboring pico base station of the macro base station 28 because the pico base station cell 34 of the pico base station 32 borders the macro base station cell 30 of the macro base station 28. Specifically, as used herein, a pico base station neighbors a macro base station when the macro base station cell completely encompasses the pico base station cell, when the macro base station cell overlaps the pico base station cell, or when the macro base station cell otherwise borders the pico base station cell. Notably, while FIG. 3 shows only one macro base station 28 and one pico base station 32, the heterogeneous cellular network 26 typically includes numerous macro base stations 28 where at least some of the macro base stations 28 have one or more neighboring pico base stations 32.

The macro and pico base stations 28 and 32 provide cellular communication service to user equipments (UEs) 36 through 42 located within their corresponding cells 30 and 34. More specifically, the macro base station 28 serves UEs, such as the UE 36, that are located within the macro base station cell 30. The pico base station 32 serves UEs, such as the UE 38, that are located within the pico base station cell 34. The pico base station cell 34 has a primary border 44 that is adjusted to either a border 48 for primarily uplink traffic or a border 50 for primarily downlink traffic on a per UE basis based on primary direction of traffic flow. For example, in one particular embodiment, the heterogeneous cellular network 26 is a heterogeneous Long Term Evolution (LTE) cellular network, and the primary border 44 corresponds to a Reference Signal Received Power (RSRP) offset of 0 decibels (dB), the border 48 corresponds to a negative RSRP offset in Equation (1) below, and the border 50 corresponds to a positive RSRP offset in Equation (1) below. Notably, while in this example the border 50 for primarily downlink traffic is contracted with respect to the primary border 44, the present disclosure is not limited thereto. For instance, the border 50 for primarily downlink traffic may be outside, or expanded with respect to, the primary border 44 but within the border 48 for primarily uplink traffic.

According to the present disclosure, UEs, such as the UEs 40 and 42, that are located within a transition zone 46 between the macro base station cell 30 and the pico base station cell 34 are served by either the macro base station 28 or the pico base station 32 depending on a primary direction of traffic flow for those UEs. More specifically, cell selection is controlled by adjusting the border of the pico base station 32 on a per UE basis based on primary direction of traffic flow. For purposes of cell selection for the UE 40, the border of the pico base station cell 34 is adjusted to the border 50, or boundary, for primarily downlink traffic flow if a primary direction of traffic flow for the UE 40 is a downlink direction. In contrast, the border of the pico base station cell 34 for the UE 40 is adjusted to the border 48, or extended boundary, for primarily uplink traffic flow if the primary direction of traffic flow for the UE 40 is an uplink direction. Thus, in this example, the UE 40 is within the macro base station cell 30 (i.e., served by the macro base station 28) if the primary direction of traffic flow for the UE 40 is the downlink direction or within the pico base station cell 34 (i.e., served by the pico base station 32) if the primary direction of traffic flow for the UE 40 is the uplink direction. The same is true for the UE 42. In contrast, the UE 36 is served by the macro base station 28 regardless of its primary direction of traffic flow, and the UE 38 is served by the pico base station 32 regardless of its primary direction of traffic flow.

By adjusting the border of the pico base station cell 34 based on the primary direction of traffic flow, cell selection is performed on a per UE basis such that, for UEs located within the transition zone 46, the macro base station cell 30 is favored for UEs whose primary direction of traffic flow is the downlink direction, and the pico base station cell 34 is favored for UEs whose primary direction of traffic flow is the uplink direction. In this manner, UEs, such as the UEs 40 and 42, are connected to the base station 28 or 32 providing the best link for their primary direction of traffic flow. More specifically, because a transmission power of the macro base station 28 is significantly higher than a transmission power of the pico base station 32, favoring the macro base station 28 for UEs having a primarily downlink direction of traffic flow results in a better downlink and thus higher data rate for those UEs. Likewise, because the UEs 40 and 42 have relatively low transmission power, favoring the pico base station 32, which is much closer to the UEs 40 and 42 than the macro base station 28, for UEs having a primarily uplink direction of traffic flow results in the best uplink and thus higher data rates for those UEs.

Figure 4:
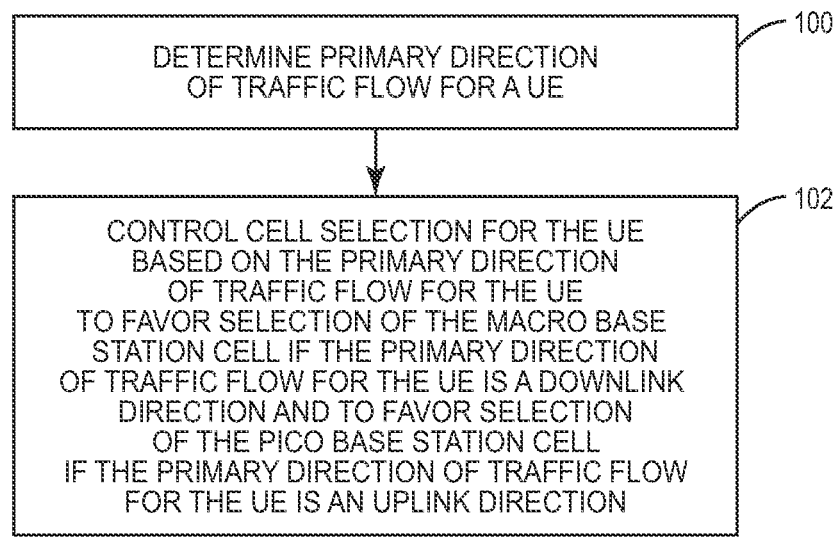
FIG. 4 illustrates a process for controlling cell selection between a macro base station cell of a macro base station and a pico base station cell of a neighboring pico base station for a user equipment based on a primary direction of traffic flow for the user equipment according to one embodiment of the present disclosure.

FIG. 4 is a flow chart illustrating a cell selection process based on primary direction of traffic flow according to one embodiment of the present disclosure. In this embodiment, this process is performed by the macro base station 28. However, the present disclosure is not limited thereto. This process may alternatively be performed by another node in the heterogeneous cellular network 26. Further, this process is preferably used for cell section for UEs, such as the UEs 40 and 42 located within the transition zone 46. However, this process may be used for cell selection for all UEs located within the macro and pico base station cells 30 and 34.

First, the macro base station 28 determines a primary direction of traffic flow for a UE (step 100). In this example, the UE is the UE 40. Any suitable process may be used to determine the primary direction of traffic flow for the UE 40. In one embodiment, the macro base station 28 obtains an uplink buffer size for the UE 40 and then determines the primary direction of traffic flow for the UE 40 based on the uplink buffer size. The uplink buffer size is an amount of data waiting in an uplink buffer at the UE 40 to be transmitted via the uplink of the UE 40. For instance, the macro base station 28 may determine that the primary direction of traffic flow for the UE 40 is the uplink direction if the uplink buffer size for the UE 40 is greater than or equal to a predefined uplink buffer size threshold. Otherwise, the primary direction of traffic flow may be determined to be the downlink direction. In a similar manner, the macro base station 28 may obtain a downlink buffer size for the UE 40 and then determine the primary direction of traffic flow based on the downlink buffer size. The downlink buffer size is an amount of data waiting in a downlink buffer to be transmitted to the UE 40 via the downlink to the UE 40. For instance, the macro base station 28 may determine that the primary direction of traffic flow for the UE 40 is the downlink direction if the downlink buffer size for the UE 40 is greater than or equal to a predefined downlink buffer size threshold. Otherwise, the primary direction of traffic flow may be determined to be the uplink direction.

In another embodiment, the macro base station 28 obtains the uplink buffer size and the downlink buffer size for the UE 40 and then determines the primary direction of traffic flow for the UE 40 based on the uplink and downlink buffer sizes for the UE 40. As one example, the macro base station 28 may determine that the primary direction of traffic flow for the UE 40 is the uplink direction if the uplink buffer size is greater than the downlink buffer size. Otherwise, the primary direction of traffic flow is the downlink direction. As another example, the macro base station 28 may determine that the primary direction of traffic flow for the UE 40 is the uplink direction if the uplink buffer size is greater than or equal to a sum of the downlink buffer size and a predefined threshold. Otherwise, the primary direction of traffic flow is the downlink direction. As yet another example, the macro base station 28 may determine that the primary direction of traffic flow for the UE 40 is the uplink direction if the uplink buffer size is greater than or equal to a predefined uplink buffer threshold and the uplink buffer size is greater than or equal to a sum of the downlink buffer size and a predefined threshold. Otherwise, the primary direction of traffic flow is the downlink direction.

Similarly, as one example, the macro base station 28 may determine that the primary direction of traffic flow for the UE 40 is the downlink direction if the downlink buffer size is greater than the uplink buffer size. Otherwise, the primary direction of traffic flow is the uplink direction. As another example, the macro base station 28 may determine that the primary direction of traffic flow for the UE 40 is the downlink direction if the downlink buffer size is greater than or equal to a sum of the uplink buffer size and a predefined threshold. Otherwise, the primary direction of traffic flow is the uplink direction. As yet another example, the macro base station 28 may determine that the primary direction of traffic flow for the UE 40 is the downlink direction if the downlink buffer size is greater than or equal to a predefined downlink buffer size threshold and the downlink buffer size is greater than or equal to a sum of the uplink buffer size and a predefined threshold. Otherwise, the primary direction of traffic flow is the uplink direction.

Once the primary direction of traffic flow for the UE 40 is determined, the macro base station 28 controls cell selection for the UE 40 based on the primary direction of traffic flow for the UE 40 to favor selection of the macro base station cell 30 if the primary direction of traffic flow for the UE 40 is the downlink direction and to favor selection of the pico base station cell 34 if the primary direction of traffic flow for the UE 40 is the uplink direction (step 102). More specifically, if the primary direction of traffic flow for the UE 40 is the downlink direction, the macro base station 28 sets the border of the pico base station cell 34 for purposes of cell section for the UE 40 to the border 50 for primarily downlink traffic, thereby favoring selection of the macro base station cell 30 for the UE 40 and making selection of the pico base station cell 34 more difficult. Conversely, if the primary direction of traffic flow for the UE 40 is the uplink direction, the macro base station 28 sets the border of the pico base station cell 34 for purposes of cell selection for the UE 40 to the border 48 for primarily uplink traffic, thereby favoring selection of the pico base station cell 34 for the UE 40 and making selection of the macro base station cell 30 more difficult. In this manner, the UE 40 is connected to the base station 28 or 32 providing the best link for the primary direction of traffic flow for the UE 40.

Figure 5:
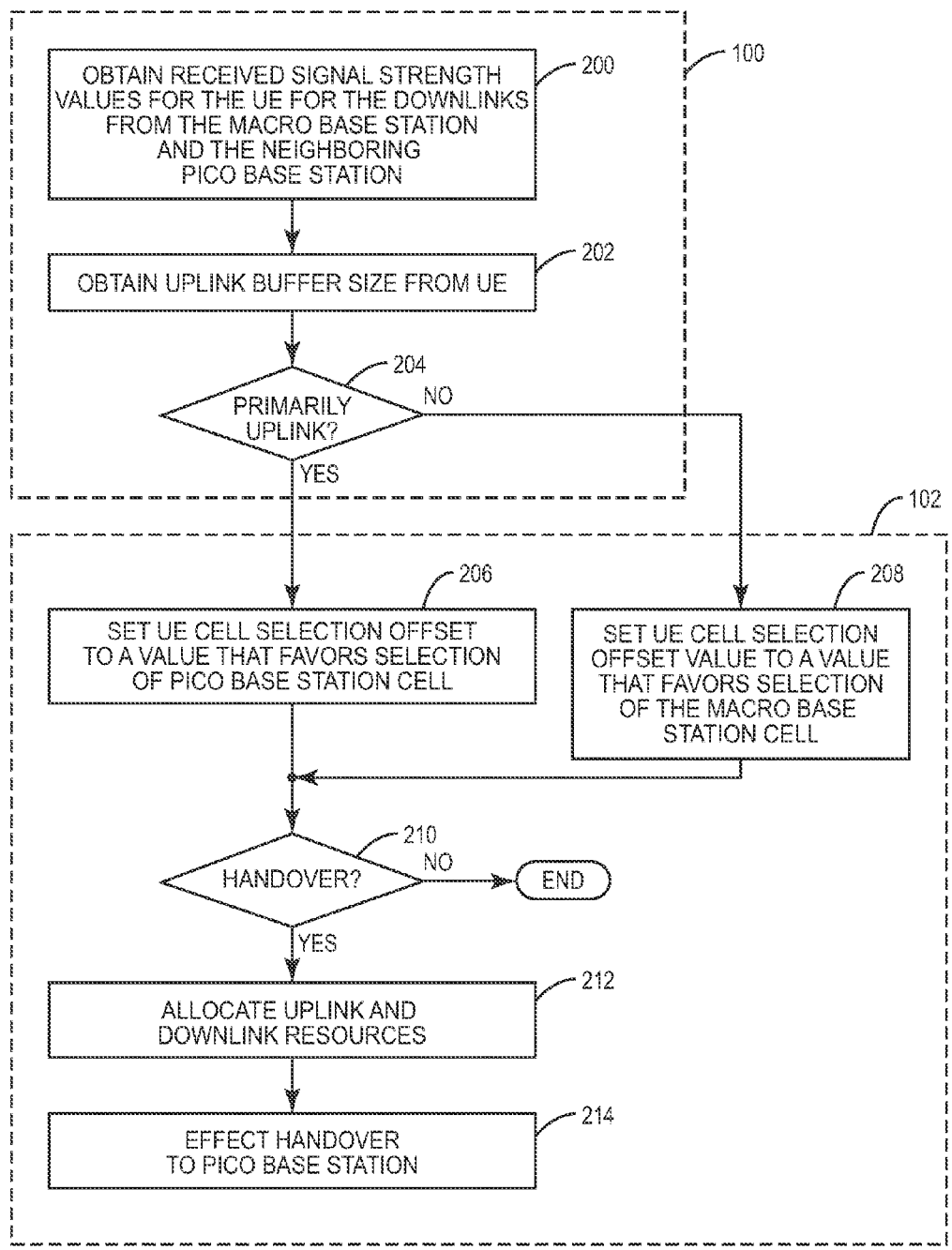
FIG. 5 is a more detailed illustration of the process of FIG. 4 according to one embodiment of the present disclosure.

FIG. 5 is a flow chart illustrating the process of FIG. 4 in more detail according to one embodiment of the present disclosure. Again, the UE 40 is used for this example and at a starting point it is connected to the macro base station cell 30. However, this process may be used for cell selection of the other UEs 36, 38, and 42, or at least the other UE 42 in the transition zone 46. First, the macro base station 28 obtains received signal strength values from the UE 40 for downlinks from the macro base station 28 and the neighboring pico base station 32 (step 200). In one embodiment, the heterogeneous cellular network 26 is an LTE cellular network, and the received signal strength values include a RSRP value measured by the UE 40 for a downlink from the macro base station 28 and a RSRP value measured by the UE 40 for a downlink from the pico base station 32. Note that the concepts disclosed herein are compatible with LTE Release 8. However, they are not limited to LTE Release 8. They can be applied to any type of wireless communication system employing the same principle of cell selection. In addition, the macro base station 28 obtains an uplink buffer size from the UE 40 (step 202).

The macro base station 28 then determines whether primary direction of the traffic flow for the UE 40 is the uplink direction (step 204). More specifically, in this embodiment, the macro base station 28 determines that the primary direction of traffic flow for the UE 40 is the uplink direction if the uplink buffer size for the UE 40 is greater than or equal to a predefined uplink buffer size threshold and the uplink buffer size is greater than or equal to a sum of a downlink buffer size for the UE 40 and a predefined threshold. Otherwise, the primary direction of traffic flow is the downlink direction.

If the primary direction of traffic flow for the UE 40 is the uplink direction, the macro base station 28 sets a UE cell selection offset for the UE 40 to a value that favors selection of the pico base station cell 34 (step 206). Conversely, if the primary direction of traffic flow for the UE 40 is not the uplink direction (i.e., is the downlink direction), the macro base station 28 sets the UE cell selection offset for the UE 40 to a value that favors selection of the macro base station cell 30 (step 208). More specifically, in the preferred embodiment, the border of the pico base station cell 34 is adjusted on a per UE basis using UE cell selection offsets. If the primary direction of traffic flow for the UE 40 is the uplink direction, the UE cell selection offset for the UE 40 is set to a value (M) that sets the border of the pico base station cell 34 to the border 48 for primarily uplink traffic. Conversely, if the primary direction of traffic flow for the UE 40 is the downlink direction, the UE cell selection offset for the UE 40 is set to a value (K) that sets the border of the pico base station cell 34 to the border 50 for primarily downlink traffic.

Next, whether proceeding from step 206 or 208, the macro base station 28 determines whether a handover is to be performed for the UE 40 (step 210). In this exemplary embodiment, the UE 40 is currently located in the macro base station cell 30 (i.e., served by the macro base station 28), and the macro base station 28 determines whether a handover is to be performed from the macro base station 28 to the pico base station 32 based on the received signal strength values for the downlinks to the UE 40 from the macro and pico base stations 28 and 32. However, it should be noted that a similar process may be used to determine whether a handover is to be performed from the pico base station 32 to the macro base station 28 in the situation where the UE 40 is initially located in the pico base station cell 34.

More specifically, in one embodiment, the heterogeneous cellular network 26 is an LTE network, and the macro base station 28 determines that a handover from the macro base station 28 to the pico base station 32 is to be performed for the UE 40 if the UE 40 is currently located in the macro base station cell 30 (i.e., served by the macro base station 28) and:

$$\text{RSRP}_{PICO} \geq \text{RSRP}_{MACRO} + \text{HO\_Hysteresis} + \text{UE\_Cell\_Selection\_Offset} \quad (1)$$

where $\text{RSRP}_{PICO}$ is the RSRP value measured by the UE 40 for the downlink from the pico base station 32 to the UE 40, $\text{RSRP}_{MACRO}$ is the RSRP value measured by the UE 40 for the downlink from the macro base station 28 to the UE 40, HO_Hysteresis is a hysteresis value that prevents UEs too frequently switching between the macro and pico base stations 28 and 32, and UE_Cell_Selection_Offset is the UE cell selection offset of the UE 40, which was set in either step 206 or step 208. Specifically, when using Equation (1), if the primary direction of traffic flow is the uplink direction, then, in step 206, the UE cell selection offset for the UE 40 is set to a value (M) that is a negative value. In one embodiment, this negative value is between 0 and a difference (in dB) between transmission powers of the macro and pico base stations 28 and 32. In LTE, the difference between the transmission powers of the macro and pico base stations 28 and 32 is typically 16 dB or a value close to 16 dB. Conversely, if the primary direction of traffic flow is the downlink direction, then, in step 208, the UE cell selection offset for the UE 40 is set to a value (K), where K may be a positive value, 0, or a negative value depending on the particular implementation. If K is a positive value, K is greater than or equal to 0 and limited to small values close to 0. The positive value results in a contraction of the border of the pico base station cell 34 from the primary border 44 to the border 50 for primarily downlink traffic. If K is a negative value, K is a negative value but is limited to |K|<|M|. In this case, contrary to what is shown in FIG. 3, the border 50 for primarily downlink traffic is expanded with respect to the primary border 44 but is between the primary border 44 and the border 48 for primarily uplink traffic.

Before proceeding, it should be noted that a similar process may be used to determine whether a handover from the pico base station 32 to the macro base station 28 is to be performed for the UE 40 in the situation where the UE 40 is initially located within the pico base station cell 34. Specifically, for this determination Equation (1) is modified to:

$$RSRP_{MACRO} \geq RSRP_{PICO} + HO\_Hysteresis + UE\_Cell\_Selection\_Offset.$$

Note, however, that the UE cell selection offset values (M and K) may be the same or different than the corresponding values used when determining whether to perform a handover from the macro base station 28 to the pico base station 32.

If the macro base station 28 determines that a handover is not to be performed, then the process ends. Otherwise, if a handover is to be performed, the macro base station 28 allocates uplink and downlink resources for the UE 40 (step 212). The specific allocated resources may vary depending on the particular protocol used for the heterogeneous cellular network 26. For instance, if the heterogeneous cellular network 26 is an LTE network, then the uplink and downlink resources allocated for the UE 40 may include one or more resource blocks allocated for the uplink and one or more resource blocks allocated for the downlink for the UE 40. In addition or alternatively, the allocated resources may include allocated downlink control channel resources. For example, if the heterogeneous cellular network 26 is an LTE network, the allocated resources preferably include Physical Downlink Control Channel (PDCCH) resources (e.g., Control Channel Elements (CCEs)) and time slots allocated for the UE 40. Due to the pre-allocation—with or without prior negotiation between the macro base station 28 and the pico base station 32—of the PDCCH resources for the UE 40, the macro base station 28 has knowledge of the allocated PDCCH resources for the UE 40 and can take appropriate actions as to not interfere with the downlink control signaling transmitted from the pico base station 32 to the UE 40 after the handover.

Regarding PDCCH allocations, it should be noted that the PDCCH resource allocations can be such that the number of PDCCH transmissions to the UE 40 after the handover to the pico base station 32 are reduced if not minimized. As an example, persistent scheduling may be applied for the UE 40. Hence, the UE 40 would be allocated resources in the uplink by using a given PDCCH only once, and this allocation would be valid until the moment the heterogeneous cellular network 26 decides to stop the allocation. The initial uplink allocation can be done on agreed PDCCH resources. Persistent scheduling may be desired if there is a large amount of data waiting to be transmitted via the uplink. In this case, uplink scheduling is performed only twice, once at the beginning and once at the end of the session.

As another example, semi-persistent scheduling for the UE 40 may be used after the handover to the pico base station 32. Semi-persistent scheduling implies uplink scheduling is done at the beginning of the session, and the UE 40 transmits periodically at a predefined period. With this scheduling policy, scheduling grants are transmitted only twice, once at the beginning and once at the end of transmission. Semi-persistent scheduling may be used for services like Voice over Internet Protocol (VoIP) or for a large amount of traffic.

As another example, the macro base station 28 allocates PDCCH resources for the UE 40. The pico base station 32 may schedule the UE 40 at its will, but the PDCCH resources to be used remain fixed at the PDCCH resources allocated for the UE 40 by the macro base station 28. In a more general context, the macro base station 28 can designate to the pico base station 32 the PDCCH resources to use for every UE, including the UE 40, in the extended border of the pico base station cell 34. Lastly, it should be noted that, after the handover, the UE 40 may be scheduled using a Transmit Time Interval (TTI) bundling approach.

After allocation of the uplink and downlink resources, the macro base station 28 then effects a handover of the UE 40 from the macro base station 28 to the pico base station 32 (step 214). More specifically, in one embodiment, the macro base station 28 sends a handover request and information that defines the uplink and downlink resources allocated for the UE 40 to the pico base station 32. In response, the pico base station 32 returns a handover acknowledgement or modified uplink and/or downlink resources for the UE 40. The macro base station 28 then completes the handover with either the uplink and downlink resources from step 212 or the modified uplink and downlink resources from the pico base station 32. Using the process of FIG. 5, uplink cell throughput and user throughput is maximized since the maximum number of users which could benefit from the better uplink provided by the pico base station 32 are handed over to the pico base station 32.

Figure 6:
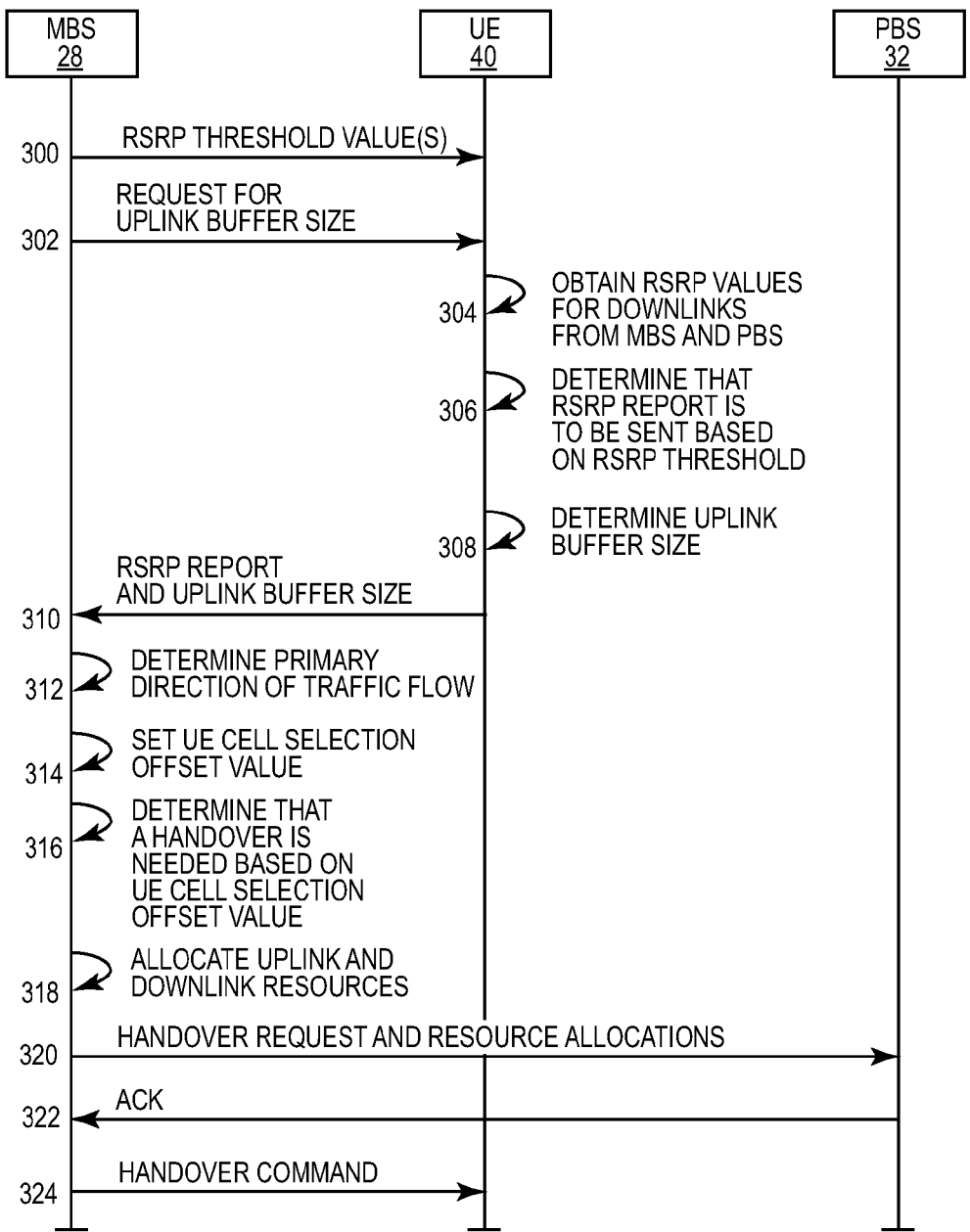
FIG. 6 illustrates communication between a macro base station, a pico base station, and a user equipment for cell selection for the user equipment based on a primary direction of traffic flow for the user equipment according to one embodiment of the present disclosure.

FIG. 6 illustrates operation of the macro base station 28, the pico base station 32, and the UE 40 to control cell selection based on a primary direction of traffic flow for the UE 40 and to perform a handover of the UE 40 based thereon according to one embodiment of the present disclosure. Again, this discussion focuses on a handover from the macro base station 28 to the pico base station 32, but a similar process may be used for a handover from the pico base station 32 to the macro base station 28. First, the macro base station 28 sends an RSRP threshold value(s) to the UE 40 (step 300). The RSRP threshold value(s) is a value(s) to be used by the UE 40 to determine whether the UE 40 is located within the transition zone 46. In one embodiment, the RSRP threshold value is a ratio of the RSRP of the macro base station 28 and the RSRP of the pico base station 32, which may be referred to as a g_threshold. For example, the g_threshold may be a difference between the transmission power of the macro base station 28 and the transmission power of the pico base station 32. It is noted here that when the UE 40 (or any UE) is measuring RSRP from the serving macro base station cell 30 and from the neighbor pico base station cell 34 or from any neighbor cell, the UE 40 is not aware if the measured neighbor cell is a pico base station cell, macro base station cell, or any type of cell. By reporting the measurements from various neighbor cells to the serving macro base station 28, the macro base station 28 is able to detect if the reported RSRP values originate from macro base station cells or from pico base station cells or, in general, the macro base station 28 can identify the type of the neighbor cell from the reported RSRP values and associated cell IDs. In addition to the RSRP threshold value(s), the macro base station 28 sends a request to the UE 40 for the uplink buffer size for the UE 40 (step 302).

The UE 40 obtains RSRP values for downlinks to the UE 40 from the macro base station 28 and the pico base station 32 (step 304). Then, based on the RSRP values and the RSRP threshold value(s), the UE 40 determines that an RSRP report is to be sent to the macro base station 28 (step 306). More specifically, in one exemplary embodiment, the RSRP threshold value is the g_threshold, and the UE 40 determines that the RSRP report is to be sent if:

$$\frac{RSRP_{MACRO}}{RSRP_{PICO}} \leq \text{g\_threshold} \quad (2)$$

After determining that the RSRP report is to be sent to the macro base station 28, the UE 40 determines an uplink buffer size for the UE 40 (step 308) and sends the RSRP report and the uplink buffer size of the UE 40 to the macro base station 28 (step 310). The uplink buffer size is an amount of data stored in an uplink buffer of the UE 40 waiting for transmission via the uplink of the UE 40. The RSRP report includes either: (1) the RSRP value for the downlink from the macro base station 28 and the RSRP value for the downlink from the pico base station 32 or (2) the ratio of the RSRP value for the downlink from the macro base station 28 over the RSRP value for the downlink from the pico base station 32.

Next, the macro base station 28 determines a primary direction of traffic flow for the UE 40 based on the uplink buffer size for the UE 40 (step 312). More specifically, in this embodiment, the macro base station 28 determines that the primary direction of traffic flow for the UE 40 is the uplink direction if the uplink buffer size for the UE 40 is greater than or equal to a predefined uplink buffer size threshold and the uplink buffer size is greater than or equal to a sum of a downlink buffer size for the UE 40 and a predefined threshold. Otherwise, the primary direction of traffic flow is the downlink direction. The downlink buffer size is an amount of data stored in a downlink buffer waiting to be transmitted to the UE 40 via the downlink from the macro base station 28 to the UE 40 (assuming that the UE 40 is currently being served by the macro base station 28).

The macro base station 28 then sets the UE cell selection offset for the UE 40 based on the primary direction of traffic flow for the UE 40 (step 314). More specifically, in this embodiment, if the primary direction of traffic flow is the uplink direction, then the macro base station 28 sets the UE cell selection offset for the UE 40 to a value (M) that is a negative value. In one embodiment, this negative value is between 0 and a difference (in dB) between transmission powers of the macro and pico base stations 28 and 32. In LTE, the difference between the transmission powers of the macro and pico base stations 28 and 32 is typically 16 dB. Conversely, if the primary direction of traffic flow is the downlink direction, then the macro base station 28 sets the UE cell selection offset for the UE 40 to a value (K) that is a positive value, 0, or a negative value depending on the particular implementation, as discussed above.

In this example, the macro base station 28 then determines that a handover from the macro base station 28 to the pico base station 32 is to be performed for the UE 40 based on the UE cell selection offset for the UE 40 (step 316). Note that a similar process may be performed to determine whether a handover from the pico base station 32 to the macro base station 28 is to be performed for the UE 40 in the situation where the UE 40 is currently located in the pico base station 32. In this embodiment, the macro base station 28 determines that a handover of the UE 40 from the macro base station 28 to the pico base station 32 is to be performed if the UE 40 is currently in the macro base station cell 30 (i.e., served by the macro base station 28) and:

$$RSRP_{PICO} \geq RSRP_{MACRO} + HO\_Hysteresis + UE\_Cell\_Selection\_Offset,$$

where $RSRP_{PICO}$ is the RSRP value measured by the UE 40 for the downlink from the pico base station 32 to the UE 40, $RSRP_{MACRO}$ is the RSRP value measured by the UE 40 for the downlink from the macro base station 28 to the UE 40, HO_Hysteresis is a hysteresis value that prevents UEs from too frequently switching between the macro and pico base stations 28 and 32, and UE_Cell_Selection_Offset is the UE cell selection offset of the UE 40 set in step 314.

Next, the macro base station 28 allocates uplink and downlink resources for the UE 40 (step 318). After allocation of the uplink and downlink resources, the macro base station 28 sends a handover request and information that defines the uplink and downlink resources allocated for the UE 40 to the pico base station 32 (step 320). In response, the pico base station 32 returns a handover acknowledgement to the macro base station 28 (step 322).

Alternatively, the pico base station 32 may return information that defines modified uplink and/or modified downlink resources for the UE 40. The macro base station 28 then completes the handover by sending a handover command to the UE 40 (step 324). In response to the handover command, the UE 40 establishes an uplink and downlink with the pico base station 32 using the allocated resources. Using the process of FIG. 6, uplink cell throughput and user throughput is maximized since the maximum number of users which could benefit from the better uplink provided by the pico base station 32 are handed over to the pico base station 32.

Figure 7:
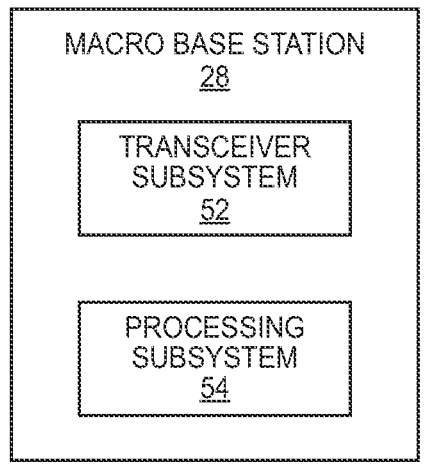
FIG. 7 is a block diagram of a macro base station according to one embodiment of the present disclosure.
Figure 8:
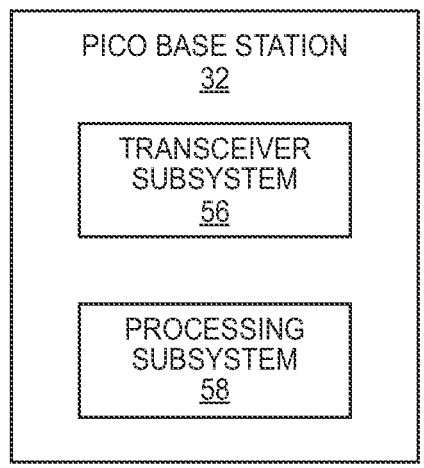
FIG. 8 is a block diagram of a pico base station according to one embodiment of the present disclosure.

FIGS. 7 and 8 are block diagrams of the macro and pico base stations 28 and 32, respectively, according to one embodiment of the present disclosure. As shown in FIG. 7, the macro base station 28 includes a transceiver subsystem 52 and a processing subsystem 54. The transceiver subsystem 52 generally includes analog and, in some embodiments, digital components for sending and receiving data to and from UEs within the macro base station cell 30. From a wireless communications protocol view, the transceiver subsystem 52 implements at least part of Layer 1 (i.e., the Physical or "PHY" Layer). The processing subsystem 54 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 52 and the processing subsystem 54, will vary depending on both the particular implementation as well as the standard or standards supported by the macro base station 28.

Similarly, as shown in FIG. 8, the pico base station 32 includes a transceiver subsystem 56 and a processing subsystem 58. The transceiver subsystem 56 generally includes analog and, in some embodiments, digital components for sending and receiving data to and from UEs within the pico base station cell 34. From a wireless communications protocol view, the transceiver subsystem 56 implements at least part of Layer 1 (i.e., the Physical or "PHY" Layer). The processing subsystem 58 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 56 and the processing subsystem 58, will vary depending on both the particular implementation as well as the standard or standards supported by the pico base station 32.

Those skilled in the art will appreciate that the block diagrams of the macro and pico base stations 28 and 32 in FIGS. 7 and 8 necessarily omit numerous features that are not necessary to a complete understanding of this disclosure. For instance, although all of the details of the processing subsystems 54 and 58 are not illustrated, those skilled in the art will recognize that the processing subsystems 54 and 58 comprise one or several general-purpose or special-purpose microprocessors or other microcontrollers programmed with suitable software and/or firmware to carry out some or all of the functionality of the macro and pico base stations 28 and 32 described herein. In addition or alternatively, the processing subsystems 54 and 56 may comprise various digital hardware blocks (e.g., one or more Application Specific Integrated Circuits (ASICs), one or more off-the-shelf digital and analog hardware components, or a combination thereof) configured to carry out some or all of the functionality of the macro and pico base stations 28 and 32 described herein.

The following acronyms are used throughout this disclosure.

ASIC Application Specific Integrated Circuit
CCE Control Channel Element
dB Decibels
LTE Long Term Evolution
PDCCH Physical Downlink Control Channel
RSRP Reference Signal Received Power
TTI Transmit Time Interval
UE User Equipment
VoIP Voice Over Internet Protocol Those skilled in the art will recognize improvements and modifications to the preferred embodiments of the present disclosure. All such improvements and modifications are considered within the scope of the concepts disclosed herein and the claims that follow.

What is claimed is:

1. A method of operation of a node in a cellular network to control cell selection for a user equipment, comprising:
    obtaining, from the user equipment, a received signal strength value for a downlink channel from a high power base station to the user equipment and a received signal strength value for a downlink channel from a low power base station to the user equipment;
    determining a primary direction of traffic flow for the user equipment located within a transition zone between a high power base station cell of the high power base station and a low power base station cell of the low power base station that neighbors the high power base station in the cellular network is an uplink direction;
    controlling cell selection for the user equipment based on the primary direction of traffic flow for the user equipment, the received signal strength value for the downlink channel from the high power base station to the user equipment, and the received signal strength value for the downlink channel from the low power base station to the user equipment, wherein controlling cell selection for the user equipment comprises:
    upon determining that the primary direction of traffic flow for the user equipment is the uplink direction, setting a user equipment cell selection offset for the user equipment to a value that favors the low power base station cell; and
    determining whether to perform a handover for the user equipment based on the user equipment cell selection offset for the user equipment, the received signal strength value for the downlink channel from the high power base station to the user equipment, and the received signal strength value for the downlink channel from the low power base station to the user equipment.

2. The method of claim 1 wherein determining the primary direction of traffic flow for the user equipment comprises:
    obtaining, from the user equipment, an uplink buffer size for the user equipment; and
    determining the primary direction of traffic flow for the user equipment based on the uplink buffer size for the user equipment.

3. The method of claim 2 wherein determining the primary direction of traffic flow for the user equipment based on the uplink buffer size for the user equipment comprises determining that the primary direction of traffic flow for the user equipment is the uplink direction if the uplink buffer size is greater than or equal to a predefined threshold.

4. The method of claim 1 wherein determining the primary direction of traffic flow for the user equipment comprises:
    obtaining, from the user equipment, an uplink buffer size for the user equipment;
    obtaining a downlink buffer size for the user equipment; and
    determining the primary direction of traffic flow for the user equipment based on the uplink buffer size and the downlink buffer size for the user equipment.

5. The method of claim 4 wherein determining the primary direction of traffic flow for the user equipment based on the uplink buffer size and the downlink buffer size for the user equipment comprises determining that the primary direction of traffic flow for the user equipment is the uplink direction if the uplink buffer size is greater than or equal to a sum of the downlink buffer size and a predefined threshold.

6. The method of claim 4 wherein determining the primary direction of traffic flow for the user equipment based on the uplink buffer size and the downlink buffer size for the user equipment comprises determining that the primary direction of traffic flow for the user equipment is the uplink direction if:
    the uplink buffer size is greater than or equal to a predefined uplink buffer size threshold; and
    the uplink buffer size is greater than or equal to a sum of the downlink buffer size and a predefined threshold.

7. The method of claim 1 wherein determining the primary direction of traffic flow for the user equipment comprises:
    obtaining a downlink buffer size for the user equipment; and
    determining the primary direction of traffic flow for the user equipment based on the downlink buffer size for the user equipment.

8. The method of claim 7 wherein determining the primary direction of traffic flow for the user equipment based on the downlink buffer size for the user equipment comprises determining that the primary direction of traffic flow for the user equipment is the downlink direction if the downlink buffer size is greater than or equal to a predefined threshold.

9. The method of claim 1 wherein determining the primary direction of traffic flow for the user equipment comprises:
    obtaining, from the user equipment, an uplink buffer size for the user equipment;
    obtaining a downlink buffer size for the user equipment; and
    determining that the primary direction of traffic flow for the user equipment is the downlink direction if the downlink buffer size is greater than or equal to a sum of the uplink buffer size and a predefined threshold.

10. The method of claim 1 wherein determining the primary direction of traffic flow for the user equipment comprises:
    obtaining, from the user equipment, an uplink buffer size for the user equipment;
    obtaining a downlink buffer size for the user equipment; and
    determining that the primary direction of traffic flow for the user equipment is the downlink direction if:
    the downlink buffer size is greater than or equal to a predefined downlink buffer size threshold; and
    the downlink buffer size is greater than or equal to a sum of the uplink buffer size and a predefined threshold.

11. The method of claim 1 wherein the cellular network is a heterogeneous Long Term Evolution, LTE, network, the received signal strength value for the downlink channel from the high power base station to the user equipment is a Reference Signal Received Power, RSRP, measurement for the downlink channel from the high power base station to the user equipment, and the received signal strength value for the downlink channel from the low power base station to the user equipment is a RSRP measurement for the downlink channel from the low power base station to the user equipment.

12. The method of claim 1 wherein the handover is a handover of the user equipment from the high power base station cell to the low power base station cell, and determining whether to perform the handover for the user equipment comprises determining whether the received signal strength value for the downlink channel from the low power base station to the user equipment is greater than or equal to a sum of the received signal strength value for the downlink channel from the high power base station to the user equipment, a handover hysteresis value, and the user equipment cell selection offset for the user equipment.

13. The method of claim 12 wherein the value that favors the low power base station is a negative value in a range of and including zero and a difference between a transmission power of the high power base station and a transmission power of the low power base station.

14. The method of claim 1 wherein determining whether to perform a handover for the user equipment comprises determining that a handover for the user equipment from the high power base station cell to the low power base station cell is to be performed if the user equipment is in the high power base station cell and the received signal strength value for the downlink channel from the low power base station to the user equipment is greater than or equal to a sum of the received signal strength value for the downlink channel from the high power base station to the user equipment, a handover hysteresis value, and the user equipment cell selection offset for the user equipment.

15. The method of claim 1 wherein the handover is a handover from the low power base station cell to the high power base station cell, and determining whether to perform the handover for the user equipment comprises determining whether the received signal strength value for the downlink channel from the high power base station to the user equipment is greater than or equal to a sum of the received signal strength value for the downlink channel from the low power base station to the user equipment, a handover hysteresis value, and the user equipment cell selection offset for the user equipment.

16. The method of claim 15 wherein the value that favors the low power base station is a negative value in a range of and including zero and a difference between a transmission power of the high power base station and a transmission power of the low power base station.

17. The method of claim 15 wherein determining whether to perform a handover for the user equipment comprises determining that a handover for the user equipment from the low power base station cell to the high power base station cell is to be performed if the user equipment is in the low power base station cell and the received signal strength value for the downlink channel from the high power base station to the user equipment is greater than or equal to a sum of the received signal strength value for the downlink channel from the low power base station to the user equipment, a handover hysteresis value, and the user equipment cell selection offset for the user equipment.

18. The method of claim 1 wherein:
determining whether to perform a handover comprises determining that a handover of the user equipment from the high power base station to the low power base station is to be performed; and
the method further comprises:
allocating uplink and downlink resources for the user equipment;
sending a handover request and information that defines the uplink and downlink resources allocated for the user equipment to the low power base station; and
sending a handover command to the user equipment to effect handover of the user equipment from the high power base station to the low power base station.

19. The method of claim 18 further comprising receiving a handover acknowledgment from the low power base station prior to sending the handover command to the user equipment.

20. The method of claim 18 further comprising receiving information that defines modified uplink and downlink resources to be allocated for the user equipment from the low power base station prior to sending the handover command to the user equipment.

21. The method of claim 18 further comprising taking appropriate actions as not to interfere with downlink control signaling transmitted from the low power base station to the user equipment.

22. A method of operation of a node in a cellular network to control cell selection for a user equipment, comprising:
obtaining, from the user equipment, a received signal strength value for a downlink channel from a high power base station to the user equipment and a received signal strength value for a downlink channel from a low power base station to the user equipment;
determining a primary direction of traffic flow for the user equipment located within a transition zone between a high power base station cell of the high power base station and a low power base station cell of the low power base station that neighbors the high power base station in the cellular network is a downlink direction;
controlling the cell selection for the user equipment based on the primary direction of traffic flow for the user equipment, the received signal strength value for the downlink channel from the high power base station to the user equipment, and the received signal strength value for the downlink channel from the low power base station to the user equipment comprises:
upon determining that the primary direction of traffic flow for the user equipment is the downlink direction, setting a user equipment cell selection offset for the user equipment to a value that favors the high power base station cell; and
determining whether to perform a handover for the user equipment based on the user equipment cell selection offset for the user equipment, the received signal strength value for the downlink channel from the high power base station to the user equipment, and the received signal strength value for the downlink channel from the low power base station to the user equipment.

23. The method of claim 22 wherein the handover is a handover of the user equipment from the high power base station cell to the low power base station cell, and determining whether to perform the handover for the user equipment comprises determining whether the received signal strength value for the downlink channel from the low power base station to the user equipment is greater than or equal to a sum of the received signal strength value for the downlink channel from the high power base station to the user equipment, a handover hysteresis value, and the user equipment cell selection offset for the user equipment.

24. The method of claim 23 wherein the value that favors the high power base station is a positive value that is greater than or equal to zero.

25. The method of claim 23 wherein the value that favors the high power base station is a negative value having an absolute value that is less than an absolute value of a value to which the user equipment cell selection offset is set if the primary direction of traffic flow is the uplink direction.

26. The method of claim 22 wherein determining whether to perform a handover for the user equipment comprises determining that a handover for the user equipment from the high power base station cell to the low power base station cell is to be performed if the user equipment is in the high power base station cell and the received signal strength value for the downlink channel from the low power base station to the user equipment is greater than or equal to a sum of the received signal strength value for the downlink channel from the high power base station to the user equipment, a handover hysteresis value, and the user equipment cell selection offset for the user equipment.

27. The method of claim 22 wherein the handover is a handover from the low power base station cell to the high power base station cell, and determining whether to perform the handover for the user equipment comprises determining whether the received signal strength value for the downlink channel from the high power base station to the user equipment is greater than or equal to a sum of the received signal strength value for the downlink channel from the low power base station to the user equipment, a handover hysteresis value, and the user equipment cell selection offset for the user equipment.

28. The method of claim 27 wherein the value that favors the high power base station is a positive value that is greater than or equal to zero.

29. The method of claim 27 wherein the value that favors the high power base station is a negative value having an absolute value that is less than an absolute value of a value to which the user equipment cell selection offset is set if the primary direction of traffic flow is the uplink direction.

30. The method of claim 22 wherein determining whether to perform a handover for the user equipment comprises determining that a handover for the user equipment from the low power base station cell to the high power base station cell is to be performed if the user equipment is in the low power base station cell and the received signal strength value for the downlink channel from the high power base station to the user equipment is greater than or equal to a sum of the received signal strength value for the downlink channel from the low power base station to the user equipment, a handover hysteresis value, and the user equipment cell selection offset for the user equipment.

31. The method of claim 22 wherein:
determining whether to perform a handover comprises determining that a handover of the user equipment from the high power base station to the low power base station is to be performed; and
the method further comprises:
allocating uplink and downlink resources for the user equipment;
sending a handover request and information that defines the uplink and downlink resources allocated for the user equipment to the low power base station; and
sending a handover command to the user equipment to effect handover of the user equipment from the high power base station to the low power base station.

32. The method of claim 31 further comprising receiving a handover acknowledgment from the low power base station prior to sending the handover command to the user equipment.

33. The method of claim 31 further comprising receiving information that defines modified uplink and downlink resources to be allocated for the user equipment from the low power base station prior to sending the handover command to the user equipment.

34. The method of claim 31 further comprising taking appropriate actions as not to interfere with downlink control signaling transmitted from the low power base station to the user equipment.

35. A high power base station in a cellular network comprising:
a transceiver subsystem; and
a processing subsystem connected to the transceiver subsystem, the processing subsystem being adapted to:
obtain, from a user equipment, a received signal strength value for a downlink channel from the high power base station to the user equipment and a received signal strength value for a downlink channel from a low power base station to the user equipment;
determine a primary direction of traffic flow for the user equipment located within a transition zone between a high power base station cell of the high power base station and a low power base station cell of the low power base station that neighbors the high power base station in the cellular network is an uplink direction;
control cell selection for the user equipment based on the primary direction of traffic flow for the user equipment, the received signal strength value for the downlink channel from the high power base station to the user equipment, and the received signal strength value for the downlink channel from the low power base station to the user equipment, wherein being adapted to control cell selection for the user equipment comprises being adapted to:
upon determining that the primary direction of traffic flow for the user equipment is the uplink direction, set a user equipment cell selection offset for the user equipment to a value that favors the low power base station cell; and
determine whether to perform a handover for the user equipment based on the user equipment cell selection offset for the user equipment, the received signal strength value for the downlink channel from the high power base station to the user equipment, and the received signal strength value for the downlink channel from the low power base station to the user equipment.

36. A non-transitory computer-readable medium storing software for instructing a controller of a processing subsystem of a high power base station in a cellular network to:
obtain, from a user equipment, a received signal strength value for a downlink channel from the high power base station to the user equipment and a received signal strength value for a downlink channel from a low power base station to the user equipment;
determine a primary direction of traffic flow for a user equipment located within a transition zone between a high power base station cell of the high power base station and a low power base station cell of the low power base station that neighbors the high power base station in the cellular network;
control cell selection for the user equipment based on the primary direction of traffic flow for the user equipment, the received signal strength value for the downlink channel from the high power base station to the user equipment, and the received signal strength value for the downlink channel from the low power base station to the user equipment, wherein being adapted to control cell selection for the user equipment comprises being adapted to:

upon determining that the primary direction of traffic flow for the user equipment is an uplink direction, set a user equipment cell selection offset for the user equipment to a value that favors the low power base station cell; and determine whether to perform a handover for the user equipment based on the user equipment cell selection offset for the user equipment, the received signal strength value for the downlink channel from the high power base station to the user equipment, and the received signal strength value for the downlink channel from the low power base station to the user equipment.

37. The method of claim 22 wherein determining the primary direction of traffic flow for the user equipment comprises:

obtaining, from the user equipment, an uplink buffer size for the user equipment; and determining the primary direction of traffic flow for the user equipment based on the uplink buffer size for the user equipment.

38. The method of claim 37 wherein determining the primary direction of traffic flow for the user equipment based on the uplink buffer size for the user equipment comprises determining that the primary direction of traffic flow for the user equipment is the uplink direction if the uplink buffer size is greater than or equal to a predefined threshold.

39. The method of claim 22 wherein determining the primary direction of traffic flow for the user equipment comprises:

obtaining, from the user equipment, an uplink buffer size for the user equipment;

obtaining a downlink buffer size for the user equipment; and determining the primary direction of traffic flow for the user equipment based on the uplink buffer size and the downlink buffer size for the user equipment.

40. The method of claim 22 wherein determining the primary direction of traffic flow for the user equipment comprises:

obtaining a downlink buffer size for the user equipment; and determining the primary direction of traffic flow for the user equipment based on the downlink buffer size for the user equipment.

41. The method of claim 22 wherein determining the primary direction of traffic flow for the user equipment comprises:

obtaining, from the user equipment, an uplink buffer size for the user equipment;

obtaining a downlink buffer size for the user equipment; and determining that the primary direction of traffic flow for the user equipment is the downlink direction if the downlink buffer size is greater than or equal to a sum of the uplink buffer size and a predefined threshold.

42. The method of claim 22 wherein determining the primary direction of traffic flow for the user equipment comprises:

obtaining, from the user equipment, an uplink buffer size for the user equipment;

obtaining a downlink buffer size for the user equipment; and determining that the primary direction of traffic flow for the user equipment is the downlink direction if:

the downlink buffer size is greater than or equal to a predefined downlink buffer size threshold; and the downlink buffer size is greater than or equal to a sum of the uplink buffer size and a predefined threshold.

* * * * *